United States Patent
Yen et al.

(10) Patent No.: US 10,857,852 B2
(45) Date of Patent: Dec. 8, 2020

(54) ADAPTIVE RADIANT HEATING FOR A VEHICLE

(71) Applicant: GM Global Technology Operations LLC, Detroit, MI (US)

(72) Inventors: Chih-hung Yen, Bloomfield Hills, MI (US); Kuo-huey Chen, Troy, MI (US); Taeyoung Han, Bloomfield Hills, MI (US); Bahram Khalighi, Birmingham, MI (US); Shailendra Kaushik, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 35 days.

(21) Appl. No.: 16/400,536

(22) Filed: May 1, 2019

(65) Prior Publication Data
US 2020/0346516 A1 Nov. 5, 2020

(51) Int. Cl.
*F24F 11/00* (2018.01)
*B60H 1/00* (2006.01)
*B60H 1/03* (2006.01)

(52) U.S. Cl.
CPC ..... *B60H 1/00742* (2013.01); *B60H 1/00878* (2013.01); *B60H 1/034* (2013.01)

(58) Field of Classification Search
CPC ............ B60H 1/00742; B60H 1/00878; B60H 1/034; B60H 1/00814
USPC .................................................. 165/202, 237
See application file for complete search history.

(56) References Cited

U.S. PATENT DOCUMENTS

| | | | | |
|---|---|---|---|---|
| 6,079,485 A * | 6/2000 | Esaki | ................. | B60H 1/00285 165/42 |
| 6,158,225 A * | 12/2000 | Muto | ................. | B60H 1/00478 62/235.1 |
| 6,439,468 B1 * | 8/2002 | Lambert | ............ | B60H 1/00735 236/49.3 |
| 6,470,960 B2 * | 10/2002 | Kampf | ............... | B60H 1/00378 165/42 |
| 6,886,356 B2 * | 5/2005 | Kubo | ................. | B60H 1/00385 62/230 |
| 7,095,501 B2 * | 8/2006 | Lambert | .............. | B60K 28/063 356/437 |
| 7,380,586 B2 * | 6/2008 | Gawthrop | .............. | B60H 1/004 165/202 |

(Continued)

*Primary Examiner* — Claire E Rojohn, III
(74) *Attorney, Agent, or Firm* — Quinn IP Law

(57) ABSTRACT

An adaptive radiant heating system regulates a climate inside a motor vehicle cabin having a seat for a vehicle occupant. The system includes radiant heating tiles arranged proximate the seat and powered by an energy storage device. The system also includes a first sensor for detecting a position of the occupant and generating a first signal indicative thereof. The system additionally includes a second sensor for detecting a temperature within the cabin and generating a second signal indicative thereof. The system furthermore includes an electronic controller in operative communication with the tiles and the first and second sensors, and configured to regulate the climate proximate the seat via selective control of the tiles. The controller is configured to receive the first and second signals and activate at least one of the tiles in response to the first and second signals, to thereby regulate the climate proximate the seat.

18 Claims, 4 Drawing Sheets

(56) References Cited

U.S. PATENT DOCUMENTS

| | | | | |
|---|---|---|---|---|
| 7,533,535 B2* | 5/2009 | Kadle | ................ | B60H 1/00285 62/3.3 |
| 7,918,100 B2* | 4/2011 | Breed | ................ | F24F 11/30 62/244 |
| 8,191,187 B2* | 6/2012 | Brykalski | ................ | A61G 7/057 5/423 |
| 8,359,871 B2* | 1/2013 | Woods | ................ | F25B 21/02 62/3.2 |
| 8,412,381 B2* | 4/2013 | Nikovski | ................ | F24F 11/30 700/276 |
| 8,839,632 B2* | 9/2014 | Goenka | ................ | B60H 1/00742 62/3.61 |
| 9,168,810 B2* | 10/2015 | Ghosh | ................ | B60H 1/247 |
| 9,676,308 B2* | 6/2017 | Zhang | ................ | B60N 2/5657 |
| 9,682,609 B1* | 6/2017 | Dudar | ................ | B60H 1/00785 |
| 9,857,107 B2* | 1/2018 | Inaba | ................ | F25B 21/02 |
| 10,391,876 B2* | 8/2019 | Nordbruch | ................ | H04L 67/141 |
| 10,421,333 B2* | 9/2019 | Kim | ................ | B60H 1/00285 |
| 10,507,745 B2* | 12/2019 | Dry | ................ | B60N 2/5657 |
| 10,603,976 B2* | 3/2020 | Androulakis | ................ | B60N 2/5685 |
| 10,611,211 B2* | 4/2020 | Lee | ................ | B60H 1/00778 |
| 10,675,948 B2* | 6/2020 | Connell | ................ | B60H 1/00742 |
| 2004/0076214 A1* | 4/2004 | Bell | ................ | H01K 35/30 374/13 |
| 2008/0103660 A1* | 5/2008 | Browne | ................ | B60R 25/1004 701/46 |
| 2008/0173342 A1* | 7/2008 | Bell | ................ | F25B 21/04 136/201 |
| 2008/0248736 A1* | 10/2008 | Aoki | ................ | B60H 1/00742 454/75 |
| 2010/0140366 A1* | 6/2010 | Burns | ................ | B60H 1/00785 236/44 A |
| 2010/0175406 A1* | 7/2010 | Wankhede | ................ | B60H 1/00278 62/285 |
| 2011/0127025 A1* | 6/2011 | Bohme | ................ | B60H 1/00428 165/202 |
| 2011/0165829 A1* | 7/2011 | Nefcy | ................ | H01M 10/625 454/75 |
| 2011/0172880 A1* | 7/2011 | Tamura | ................ | B60H 1/00771 701/36 |
| 2011/0199026 A1* | 8/2011 | Forrest | ................ | H02J 7/35 315/362 |
| 2012/0112694 A1* | 5/2012 | Frisch | ................ | B60L 53/11 320/109 |
| 2012/0227926 A1* | 9/2012 | Field | ................ | F24H 7/0441 165/10 |
| 2014/0084679 A1* | 3/2014 | Li | ................ | B60L 8/003 307/10.1 |
| 2014/0293538 A1* | 10/2014 | Han | ................ | B60H 1/00271 361/690 |
| 2014/0306814 A1* | 10/2014 | Ricci | ................ | G06F 3/0673 340/425.5 |
| 2015/0041113 A1* | 2/2015 | Enke | ................ | B60H 1/00421 165/202 |
| 2015/0094914 A1* | 4/2015 | Abreu | ................ | B60H 1/00742 701/41 |
| 2015/0129192 A1* | 5/2015 | Boss | ................ | B60H 1/00878 165/202 |
| 2015/0183293 A1* | 7/2015 | Kim | ................ | B60H 1/00971 165/202 |
| 2015/0197135 A1* | 7/2015 | Chen | ................ | B60H 1/00028 62/3.61 |
| 2015/0197136 A1* | 7/2015 | Chen | ................ | B60H 1/00285 62/3.61 |
| 2016/0107506 A1* | 4/2016 | Johnston | ................ | B60H 1/00278 165/202 |
| 2016/0107508 A1* | 4/2016 | Johnston | ................ | B60H 1/00278 165/202 |
| 2016/0152112 A1* | 6/2016 | Stetler | ................ | B60H 1/00428 62/235.1 |
| 2017/0138627 A1* | 5/2017 | Han | ................ | F24F 11/62 |
| 2017/0369069 A1* | 12/2017 | Yen | ................ | B60W 40/09 |
| 2018/0120873 A1* | 5/2018 | Radermacher | ................ | G05D 23/1927 |
| 2018/0361825 A1* | 12/2018 | Porras | ................ | B60H 1/00385 |
| 2019/0077217 A1* | 3/2019 | Yu | ................ | B60H 1/0073 |
| 2019/0279447 A1* | 9/2019 | Ricci | ................ | B60R 25/25 |
| 2019/0283529 A1* | 9/2019 | MacNeille | ................ | B60H 1/00657 |
| 2019/0320503 A1* | 10/2019 | Han | ................ | H05B 1/0236 |
| 2020/0077540 A1* | 3/2020 | Yen | ................ | H05K 7/20172 |
| 2020/0086714 A1* | 3/2020 | Dhar | ................ | B60H 1/00921 |
| 2020/0180396 A1* | 6/2020 | Youn | ................ | B60H 1/00742 |
| 2020/0189352 A1* | 6/2020 | Han | ................ | B60N 2/879 |
| 2020/0193792 A1* | 6/2020 | Mao | ................ | G08B 21/24 |
| 2020/0198445 A1* | 6/2020 | Line | ................ | B60H 1/00371 |
| 2020/0223283 A1* | 7/2020 | Watanabe | ................ | B60H 1/00657 |

* cited by examiner

ADAPTIVE RADIANT HEATING FOR A VEHICLE

INTRODUCTION

The present disclosure is drawn to an adaptive radiant heating system for regulating climate inside a cabin of a motor vehicle.

A majority of modern motor vehicles employ a conventional powertrain using an internal combustion (IC) engine for power generation and propulsion. Some motor vehicles employ a combination of an IC engine and one or more electric motor-generators forming a hybrid powertrain. Additionally, an emerging category of motor vehicles employs electric motor-generators as their sole source of power generation and propulsion.

In a majority of motor vehicles having on-board IC engines, vehicle cabin climate, including cabin warm-up, is typically accomplished via forced air systems having heat exchangers that utilize waste heat energy produced by the IC engine. Typically, subject heat exchangers are coolant-to-air type, with the engine coolant being used to transfer heat energy to the air that is forced into the vehicle cabin. Some conventional powertrain motor vehicles, as well as hybrid and electric vehicles employ electrically powered heaters to provide vehicle cabin warm-up and thermal comfort of vehicle occupants.

SUMMARY

An adaptive radiant heating system is configured to regulate a climate inside a cabin of a motor vehicle having a seat configured to support a vehicle occupant. The system includes a plurality of radiant heating tiles arranged inside the cabin proximate the seat and configured to generate thermal energy. The system additionally includes an energy storage device configured to power the plurality of radiant heating tiles. The system also includes a first sensor configured to detect a parameter indicative of a position of the vehicle occupant supported by the seat and generate a first signal indicative of the detected parameter. The system additionally includes a second sensor configured to detect a characteristic of the climate, i.e., temperature inside the cabin, and generate a second signal indicative thereof. The system furthermore includes an electronic controller in operative communication with the plurality of radiant heating tiles, the first sensor, and the second sensor, and configured or programmed to regulate the climate of the cabin proximate the seat via selective control of the radiant heating tiles. The electronic controller is configured to receive the first and second signals and activate at least one of the plurality of radiant heating tiles in response to the first and second signals, to thereby regulate the climate proximate the seat.

The electronic controller may be additionally configured to identify one or more of the plurality of radiant heating tiles corresponding to a location of the second sensor in the cabin. Furthermore, the electronic controller may be configured to assess the climate proximate the location of the second sensor in comparison to a predetermined climate set-point at the location of the second sensor. In such an embodiment, the electronic controller may also be configured to activate the identified one or more of the plurality of radiant heating tiles when the assessed climate proximate the location of the second sensor is below the predetermined climate set-point.

The first sensor may be configured to detect a weight of the vehicle occupant supported by the seat.

The first sensor may be an in-vehicle camera configured to detect a size of the vehicle occupant The first sensor may be configured to detect a position of the seat in the cabin.

The seat may include a seatback recliner. In such an embodiment, the first sensor may be configured to detect a position of the seatback recliner.

The second sensor may be configured to detect one of a temperature of ambient air proximate the vehicle occupant and a temperature of the occupant.

In the embodiment of the second sensor configured to detect the temperature of the occupant, the second sensor may be an infrared sensor.

The motor vehicle may include a vehicle body defining the cabin, arranged along a longitudinal axis, and defined by longitudinal body sides, a floor, and a roof. The plurality of radiant heating tiles may be arranged along the longitudinal axis in an array proximate one of the longitudinal body sides, the floor, and the roof.

The motor vehicle may additionally include a forced-air climate control system. In such an embodiment, the electronic controller may be additionally configured to supplement a heat output of the forced-air climate control system with the plurality of radiant heating tiles by coordinating regulation of the forced-air climate control system and the selective control of the plurality of radiant heating tiles.

A motor vehicle employing the adaptive radiant heating system for regulating a climate inside the vehicle cabin is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
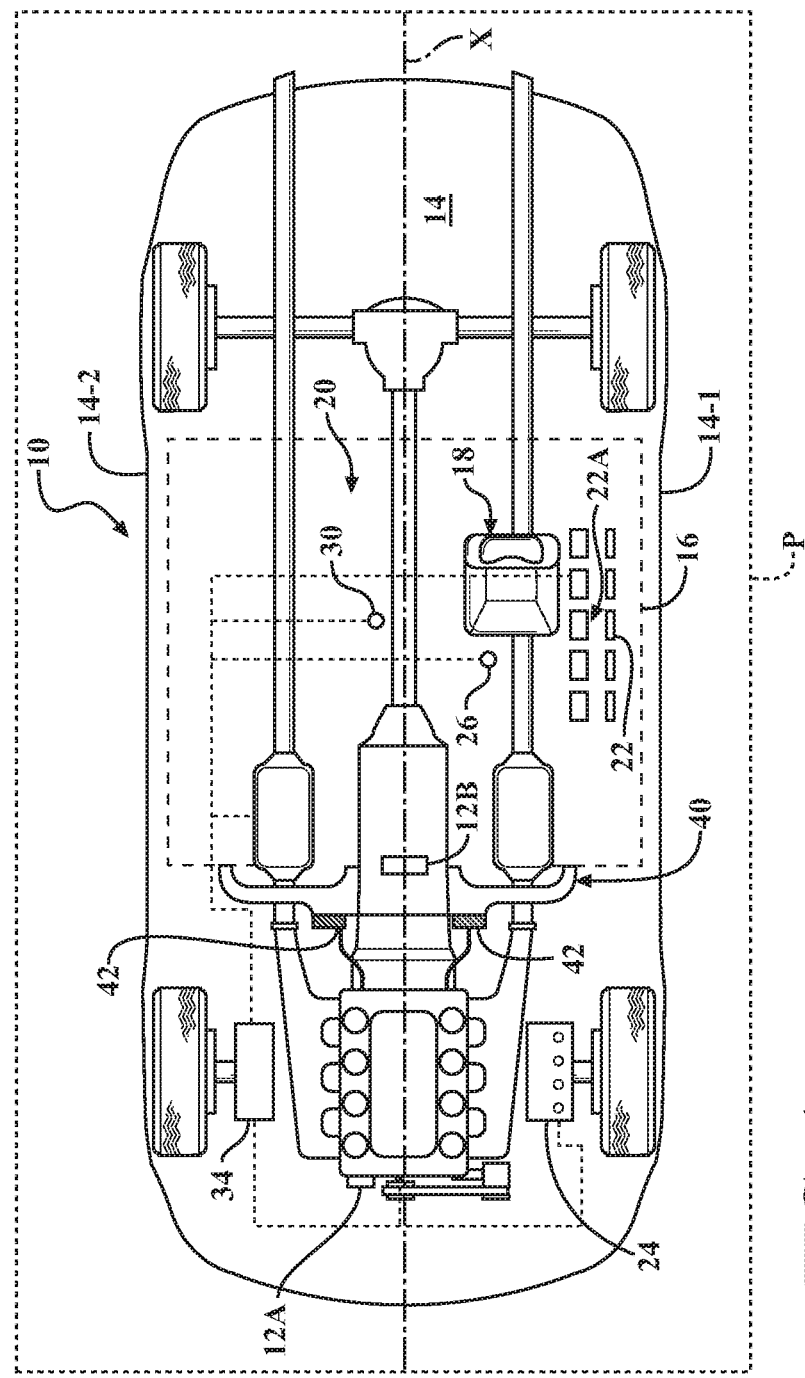
FIG. 1 is a schematic plan view of a motor vehicle having an adaptive radiant heating system along with a forced-air climate control system, according to the present disclosure.

Referring to the drawings, wherein like reference numbers refer to like components throughout the several views, FIG. 1 schematically depicts a motor vehicle 10. The motor vehicle 10 includes a powerplant configured to generate an output torque for powering the vehicle. As shown, the powerplant may be an internal combustion (IC) engine 12A configured to propel the vehicle via driven wheels. Such an internal combustion engine 12A may be a spark-ignition type or a compression-ignition or diesel type of an engine.

Additionally, the vehicle 10 may employ hybrid propulsion, where torque output from the engine 12A is augmented by other power sources, such as electric motor(s) 12B. Alternatively, the vehicle 10 may employ electric motor(s) 12B without an IC engine, and thus be configured as an electric vehicle.

Figure 2:
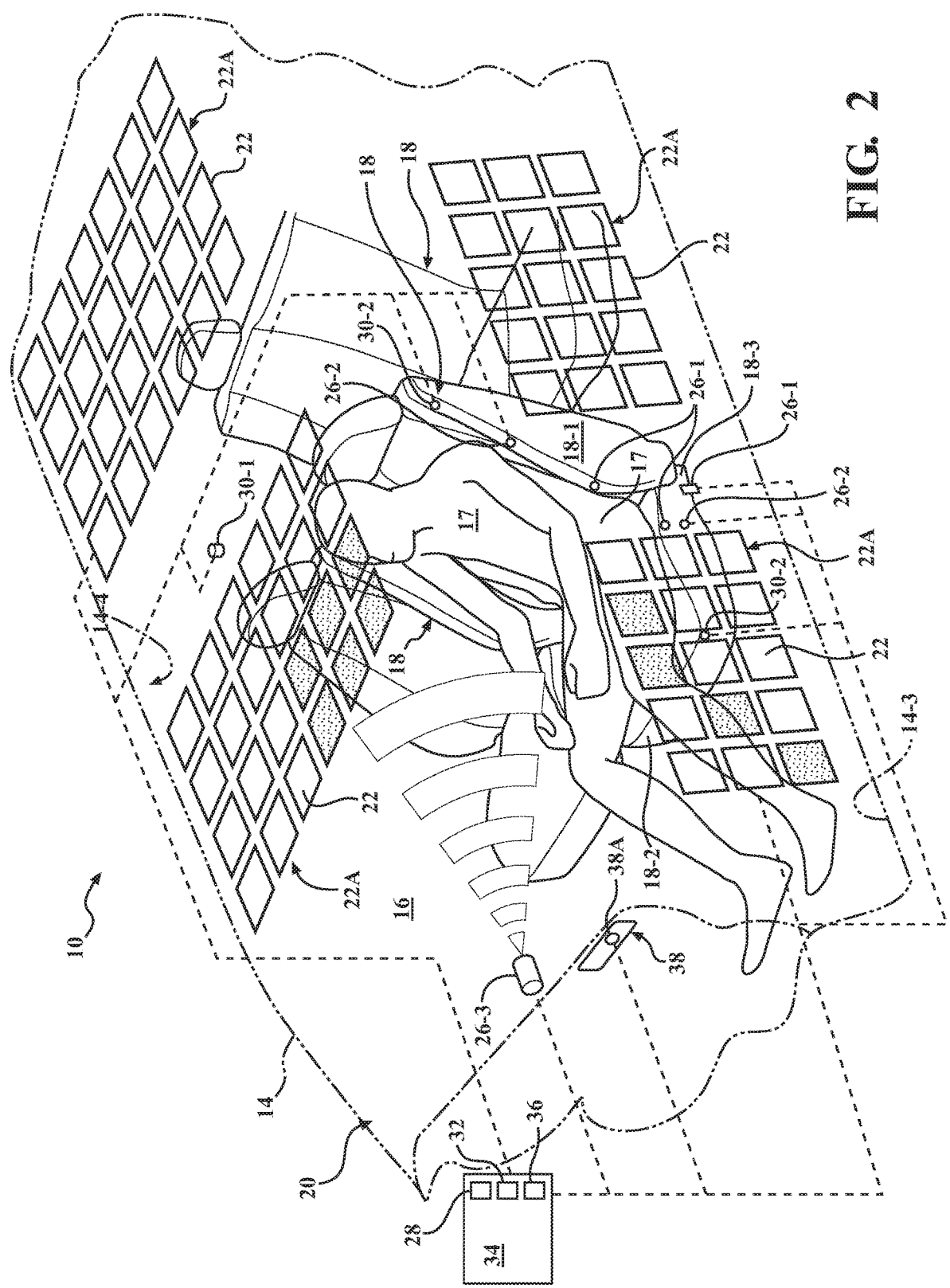
FIG. 2 is a partial perspective view of a vehicle cabin showing a conventional seating arrangement and the adaptive radiant heating system tiles arranged in individual arrays, according to the present disclosure.
Figure 3:
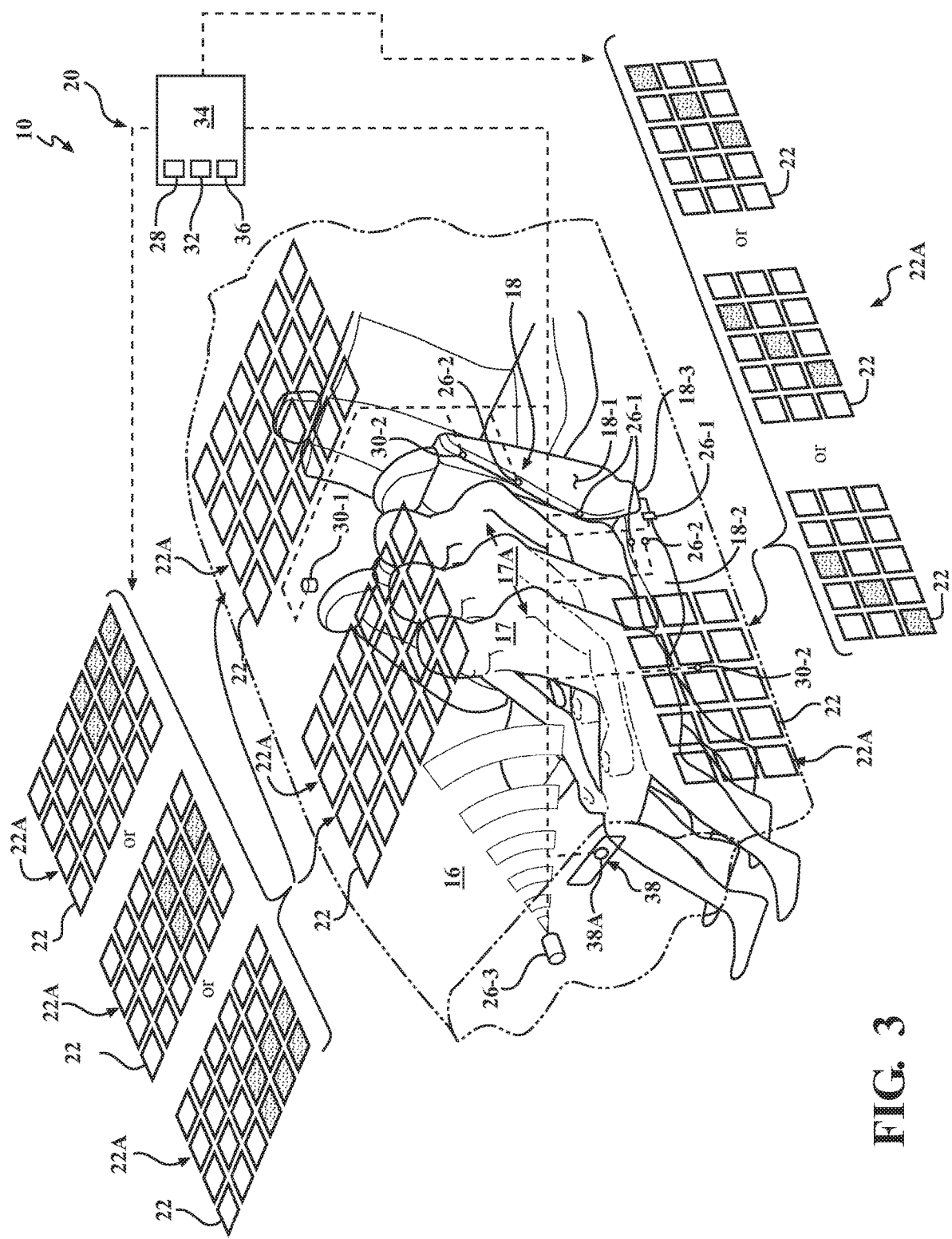
FIG. 3 is a partial perspective view of the vehicle cabin shown in FIG. 2, showing variable selection of the adaptive radiant heating system tiles among the individual arrays in accordance with the position of the vehicle occupant, according to the present disclosure.
Figure 4:
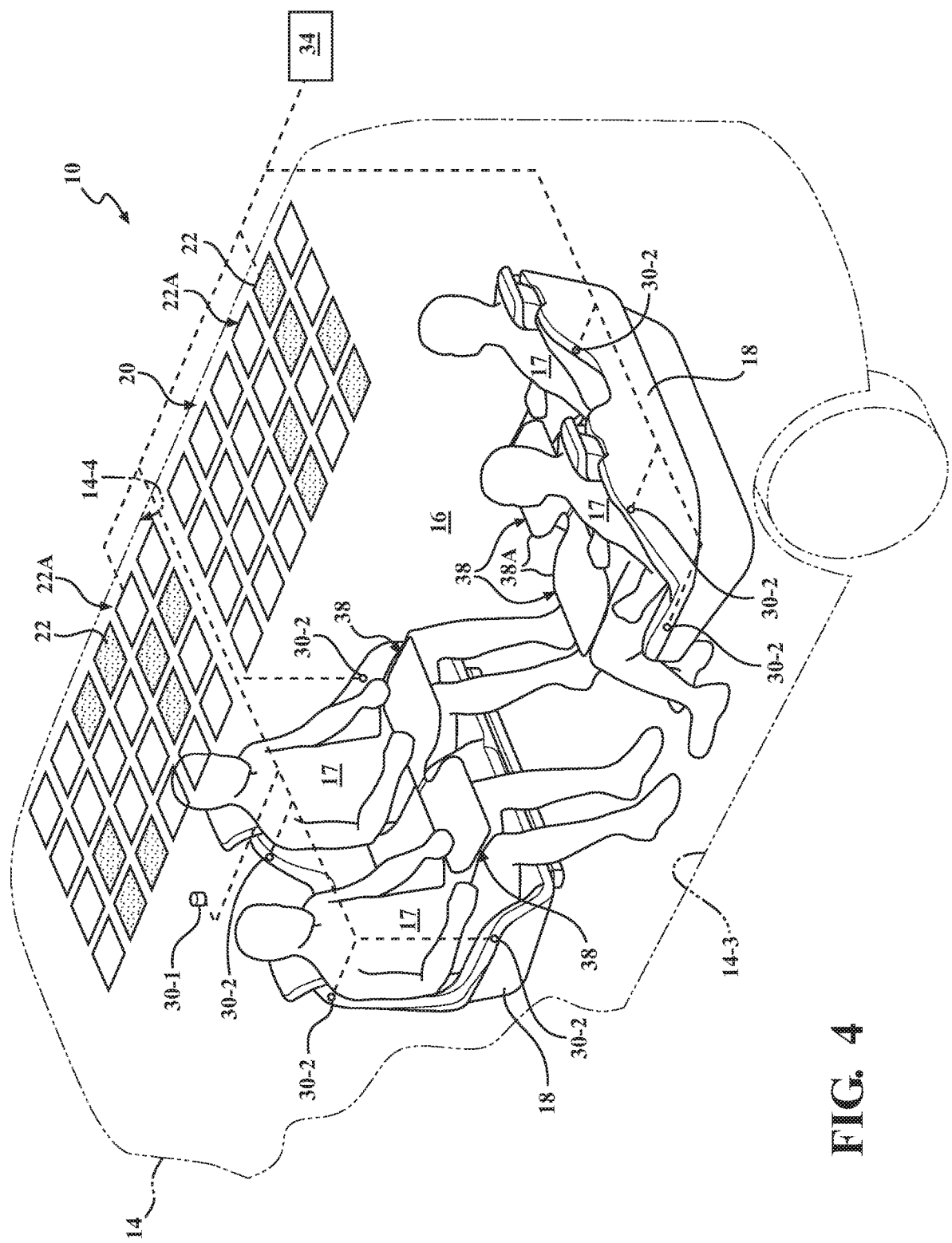
FIG. 4 is a partial perspective view of the vehicle cabin showing an alternative seating arrangement, according to the present disclosure.

The vehicle 10 may be configured as an autonomous vehicle in which assistance from various vehicle systems is employed in operating the vehicle, up to and including full automation which eschews operator involvement. The vehicle 10 is generally characterized by a vehicle body 14 arranged along a longitudinal axis X in a vehicle body plane P, and defined by longitudinal body sides 14-1, 14-2 (shown in FIG. 1), a floor 14-3, and, in some cases, a roof 14-4 (shown in FIGS. 2 and 4). The vehicle body 14 defines a vehicle interior or cabin 16 configured to accommodate vehicle occupant(s) or passenger(s) 17 (shown in FIGS. 2-4). Specifically, as shown in FIGS. 1-4, at least one seat 18 is moveably arranged or mounted in the cabin 16. Each seat 18 is configured to support the vehicle occupant 17 via a number of adjustments, such as for seat position along the axis X and seat height relative to the floor 14-3. The seat 18 includes a seatback 18-1 and a cushion 18-2. The seat 18 may also include a recliner mechanism 18-3, i.e., a recline adjustment of the seatback 18-1 relative to the cushion 18-2. FIGS. 2 and 3 specifically depict a conventional seating arrangement, where the seats 18 face the front of the vehicle 10. As shown in FIG. 4, the vehicle 10 may employ an alternative seating arrangement, where at least some of the seats 18 face each other. Such an alternative seating arrangement may be especially useful in autonomous vehicles.

As shown in FIGS. 1-4, the vehicle 10 also includes an adaptive radiant heating system 20 for regulating a climate inside the cabin of a motor vehicle, the system including a plurality of radiant heating tiles 22 inside the cabin 16 proximate the seat 18. As defined herein, the term "radiant" denotes that the heating tiles are configured to generate thermal energy and radiate such energy inside the cabin and toward the occupant of the seat 18. Radiant heating provides almost instantaneous warmth sensation to vehicle occupants 17 with less energy consumption suitable for both electric and non-electric vehicles. Each of the radiant heating tiles 22 may be constructed from a positive temperature coefficient (PTC) material. In general, PTC material is characterized by internal resistance that increases with temperature. PTC material is a self-regulating heater capable of rapidly heating up to a constant temperature with application of electrical current, radiating heat outward, and maintaining its temperature unaffected by changes in ambient temperature.

An energy storage device 24 (shown in FIG. 1), such as a battery, is configured to power the radiant heating tiles 22, and facilitate generation of the thermal energy thereby. The radiant heating tiles 22 may be generally arranged along the longitudinal axis X in an array 22A (shown in FIGS. 2-4) proximate one of the longitudinal body sides 14-1, 14-2, proximate the floor 14-3, or proximate the roof 14-4. The adaptive radiant heating system 20 also includes one or more first sensors 26 (shown in FIG. 1). Each first sensor 26 is arranged in the cabin 16 and configured to detect a parameter indicative of a position of the vehicle occupant 17 supported by the seat 18 and generate a first signal 28 indicative of the detected subject parameter. The parameter detected by the first sensor 26 may be indicative of a size, such as weight and height, of the vehicle occupant 17. Alternatively, the parameter detected by an embodiment of the first sensor 26 may be indicative of a position of the seat 18 in the cabin 16, or, if the seat includes the seatback recliner 18-3, a position or state of the recliner and the seatback 18-1.

An embodiment of the first sensor 26 may be an electronic position sensor 26-1, for example mounted on the seat 18, configured to detect a position of the seat relative to the cabin 16, such as along the axis X. In the embodiment of the seat 18 having the seatback recliner 18-3, the first sensor 26-1 may be configured to detect a position of the recliner, and therefore of the seatback 18-1. In a separate embodiment, the first sensor 26-1 may be a weight sensor 26-2, such as a strain gauge, configured to detect a weight of the vehicle occupant 17 supported by the seat 18. In the embodiment of the first sensor configured to detect the weight of the occupant 17, one such sensor 26-2 may be mounted to the seatback 18-1 and another sensor may be mounted on the cushion 18-2. In another embodiment, the first sensor 26 may be an in-vehicle camera 26-3 configured to detect a size, e.g., height and girth, of the vehicle occupant 17 and/or the position of the vehicle occupant within the cabin 16. Overall, the adaptive radiant heating system 20 may include a plurality of first sensors, such that more than one embodiment of the first sensor 26-1, 26-2, and 26-3, with attendant specific parameters being detected, is included on the particular vehicle 10.

The adaptive radiant heating system 20 also includes a second sensor 30 (shown in FIG. 1). The second sensor 30 is arranged in the cabin 16 proximate the plurality of radiant heating tiles 22. The second sensor 30 is configured to detect a characteristic of the climate inside the cabin 16, specifically the temperature within the cabin 16 proximate the seat 18, and generate a second signal 32 indicative of the detected temperature. The system 20 may include a plurality of second sensors 30 to detect ambient temperature in multiple locations throughout the cabin 16. It is specifically intended that there would be at least one second sensor 30 arranged proximate every seat 18 and configured to detect cabin 16 temperature when the subject seat is occupied.

In one embodiment, the second sensor 30 may be a temperature sensor 30-1 specifically configured to detect a temperature of the ambient cabin air proximate the vehicle occupant 17. Alternatively, the second sensor 30 may be a temperature sensor 30-2 configured to detect a temperature of the vehicle occupant 17. A number of second temperature sensors 30-2 configured to detect a temperature of individual areas of the vehicle occupant 17, such as the head, the torso, and the leg areas. In the embodiment of the second sensor(s) 30-2 being configured to detect the temperature of the occupant 17, the second sensor(s) may utilize infrared technology. The infrared sensor embodiment of the second sensor(s) 30-2 may, therefore, be configured to generate thermal imaging data indicative of the occupant's temperature and communicate such data via the second signal 32. Overall, the adaptive radiant heating system 20 may include a plurality of second sensors, such that more than one embodiment of the second sensor 30-1 and 30-2 with attendant specific parameters being detected, is included on the particular vehicle 10.

The adaptive radiant heating system 20 further includes an electronic controller 34. The electronic controller 34 is in operative communication with the plurality of radiant heating tiles 22, the first sensor 26, and the second sensor 30, and configured or programmed to regulate the ambient climate of the cabin 16 proximate the seat 18 via selective control of the plurality of tiles. The electronic controller 34 is configured to receive the first signal(s) 28 and the second signal(s) 32. The signals from the first and second sensors 26, 30 may be communicated to the electronic controller 34 via a data network, e.g. a Controller Area Network (CAN bus), arranged in the vehicle 10. The electronic controller 34 is configured, i.e., structured and programmed, to activate at least one of the plurality of radiant heating tiles 22 in response to the first and second signals 28, 32, to thereby regulate the climate proximate the seat 18 and provide thermal comfort of the vehicle occupant 17.

As shown in FIG. 1, the electronic controller 34 is arranged on the vehicle 10. The electronic controller 34 may be a central processing unit (CPU) or a body control module (BCM) configured to regulate operation of various vehicle systems. The electronic controller 34 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 34 may include, for example, optical or magnetic disks and other persistent memory.

Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to respective first and second sensors 26, 30. Memory of the electronic controller 34 may also include a flexible disk, hard disk, magnetic tape, other magnetic medium, a CD-ROM, DVD, other optical medium, etc. The electronic controller 34 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 34 or accessible thereby may be stored in the memory and automatically executed to provide the required functionality.

The electronic controller 34 may also be configured to identify one or more of the plurality of radiant heating tiles 22 corresponding to a location of a particular identified second sensor 30 in the cabin 16. The electronic controller 34 may be additionally configured to assess the climate, i.e., temperature, proximate the location of the identified second sensor 30 in comparison to a predetermined climate or temperature set-point 36 at the location of the subject second sensor 30. Furthermore, the electronic controller 34 may be configured to automatically activate the identified one or more of the plurality of radiant heating tiles 22 when the assessed climate proximate the location of the identified second sensor 30 is below the predetermined climate set-point 36. FIG. 3 specifically depicts variable selection and activation of the radiant heating tiles 22 among the individual tile arrays 22A in accordance with various positions of the vehicle occupant 17. The varied positions of the vehicle occupant 17 are represented by an arrow 17A and the selected and activated tiles 22 are identified via shading. The predetermined climate or temperature set-point 36 may be selected or over-ridden by the vehicle occupant 17 via an input to the electronic controller 34 at a climate control panel 38 (shown in FIG. 1) arranged in the cabin 16. Accordingly, by varying intensity of heat output from the radiant heating tiles 22, the radiant heating system 20 may be configured to regulate and adapt localized climate in the cabin 16 to specific requirements of an individual vehicle occupant 17.

The adaptive radiant heating system 20 may also include a gesture recognition feature, such as via a built-in camera, configured to acknowledge a vehicle occupant's physical gestures signifying operative system commands. The adaptive radiant heating system 20 may additionally include an over-ride feature 38A, such as a switch or an electronic input via the climate control panel 38, configured to deselect automatic activation of the radiant heating tiles 22 via the electronic controller 34. Furthermore, a desired temperature profile for each of the radiant heating tiles 22 may be preprogrammed and stored on an information technology (IT) cloud platform (not shown). Accordingly, in such an embodiment, the electronic controller 34 may be in operative communication with the IT cloud platform. Generally, an IT cloud platform is a provider-managed suite of hardware and software. An IT paradigm enables universal access to shared pools of configurable system resources and higher-level services that may be rapidly provisioned with minimal management effort, often over the Internet. Such utilization of IT cloud resources may be especially useful for managing a fleet of autonomous vehicles 10.

With resumed reference to FIG. 1, the motor vehicle 10 may additionally include a forced-air climate control system 40. The forced-air climate control system 40 may employ one or more heat exchangers 42 that utilize waste heat energy produced by the IC engine 12A as a byproduct of generated power. The subject heat exchanger(s) 42 may be configured as engine coolant-to-air type with the air being forced through the heat exchanger(s) via fan(s) (not shown). Accordingly, inside the heat exchanger(s) 42 coolant from the IC engine 12A is used to transfer heat energy to the exterior ambient air that is forced through the heat exchanger(s) and into the vehicle cabin 16 to provide cabin warm-up. However, initially during warm-up of the IC engine 12A, the engine's coolant does not absorb a significant amount of thermal energy. As a result, on a cold day, the cabin 16 may remain uncomfortably cool for an extended period of time. In the motor vehicle 10 employing each of the adaptive radiant heating system 20 and the forced-air climate control system 40, the electronic controller 34 may be additionally configured to supplement a heat output of the forced-air climate control system with the thermal energy generated by the plurality of radiant heating tiles 22.

Specifically, the electronic controller 34 may be programmed to coordinate regulation of the forced-air climate control system 40 and the selective control of the plurality of radiant heating tiles 22 to provide more rapid cabin 16 warm-up. For example, as the IC engine 12A is started from cold at sub-freezing temperature, the electronic controller 34 may access ambient temperature data via an exterior temperature sensor 42 (shown in FIG. 1) and/or interior temperature data via the second sensor 30. The electronic controller 34 may then activate one or more of the plurality of the radiant heating tiles 22 to provide rapid warm-up of the cabin 16 proximate the seat(s) 18 occupied by the vehicle passenger(s) 17. As the IC engine 12A warms up to provide sufficiently warm air into the cabin 16, the electronic controller 34 may reduce, pause, or halt the heat output of the subject radiant heating tiles 22 and supplement the output of the tiles with the forced-air climate control system 40. Accordingly, in such an embodiment, the electronic controller 34 may utilize and coordinate regulation of the forced-air climate control system 40 and the radiant heating system 20 to adapt the localized climate in the cabin 16 to the specific requirements of an individual vehicle occupant 17.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adaptive radiant heating system for regulating a climate inside a cabin of a motor vehicle having a seat configured to support a vehicle occupant, the adaptive radiant heating system comprising:
    a plurality of radiant heating tiles arranged inside the cabin proximate the seat and configured to generate thermal energy;
    an energy storage device configured to power the plurality of radiant heating tiles;
    a first sensor configured to detect a parameter indicative of a position of the vehicle occupant supported by the seat and generate a first signal indicative of the detected parameter;
    a second sensor configured to detect a temperature within the cabin and generate a second signal indicative of the detected temperature; and
    an electronic controller in operative communication with the plurality of radiant heating tiles, the first sensor, and the second sensor, and configured to regulate the climate of the cabin proximate the seat via selective control of the plurality of radiant heating tiles, wherein the electronic controller is configured to:
    receive the first and second signals; and
    activate at least one of the plurality of radiant heating tiles in response to the first and second signals, to thereby generate thermal energy by the at least one of the plurality of radiant heating tiles and regulate the climate proximate the seat; and
    identify one or more of the plurality of radiant heating tiles corresponding to a location of the second sensor in the cabin;
    assess the climate proximate the location of the second sensor in comparison to a predetermined climate set-point at the location of the second sensor; and
    activate the identified one or more of the plurality of radiant heating tiles when the assessed climate proximate the location of the second sensor is below the predetermined climate set-point.

2. The system according to claim 1, wherein the first sensor is configured to detect a weight of the vehicle occupant supported by the seat.

3. The system according to claim 1, wherein the first sensor is an in-vehicle camera configured to detect a size of the vehicle occupant.

4. The system according to claim 1, wherein the first sensor is configured to detect a position of the seat in the cabin.

5. The system according to claim 4, wherein the seat includes a seatback recliner, and the first sensor is configured to detect a position of the seatback recliner.

6. The system according to claim 1, wherein the second sensor is configured to detect one of a temperature of ambient air proximate the vehicle occupant and a temperature of the occupant.

7. The system according to claim 6, wherein the second sensor is configured to detect the temperature of the occupant, and the second sensor is an infrared sensor.

8. The system according to claim 1, wherein the motor vehicle includes a vehicle body defining the cabin, arranged along a longitudinal axis, and defined by longitudinal body sides, a floor, and a roof, and wherein the plurality of radiant heating tiles is arranged along the longitudinal axis in an array proximate one of the longitudinal body sides, the floor, and the roof.

9. The system according to claim 1, wherein the motor vehicle additionally includes a forced-air climate control system, and wherein the electronic controller is additionally configured to supplement a heat output of the forced-air climate control system with the thermal energy generated by the plurality of radiant heating tiles, by coordinating regulation of the forced-air climate control system and the selective control of the plurality of radiant heating tiles.

10. A motor vehicle comprising:
    a cabin configured to accommodate a vehicle occupant;
    a seat arranged in the cabin and configured to support the vehicle occupant; and
    an adaptive radiant heating system for regulating a climate inside the cabin, the adaptive radiant heating system including:
    a plurality of radiant heating tiles arranged inside the cabin proximate the seat and configured to generate thermal energy;
    an energy storage device configured to power the plurality of radiant heating tiles;
    a first sensor configured to detect a parameter indicative of a position of the vehicle occupant supported by the seat and generate a first signal indicative of the detected parameter;
    a second sensor configured to detect a temperature within the cabin and generate a second signal indicative of the detected temperature; and
    an electronic controller in operative communication with the plurality of radiant heating tiles, the first sensor, and the second sensor, and configured to regulate the climate of the cabin proximate the seat via selective control of the plurality of radiant heating tiles, wherein the electronic controller is configured to:
    receive the first and second signals; and
    activate at least one of the plurality of radiant heating tiles in response to the first and second signals, to thereby regulate the climate proximate the seat; and
    identify one or more of the plurality of radiant heating tiles corresponding to a location of the second sensor in the cabin;
    assess the climate proximate the location of the second sensor in comparison to a predetermined climate set-point at the location of the second sensor; and
    activate the identified one or more of the plurality of radiant heating tiles when the assessed climate proximate the location of the second sensor is below the predetermined climate set-point.

11. The motor vehicle according to claim 10, wherein the first sensor is configured to detect a weight of the vehicle occupant supported by the seat.

12. The motor vehicle according to claim 10, wherein the first sensor is an in-vehicle camera configured to detect a size of the vehicle occupant.

13. The motor vehicle according to claim 10, wherein the first sensor is configured to detect a position of the seat in the cabin.

14. The motor vehicle according to claim 13, wherein the seat includes a seatback recliner, and the first sensor is configured to detect a position of the seatback recliner.

15. The motor vehicle according to claim 10, wherein the second sensor is configured to detect one of a temperature of ambient air proximate the vehicle occupant and a temperature of the occupant.

16. The motor vehicle according to claim 15, wherein the second sensor is configured to detect the temperature of the occupant, and the second sensor is an infrared sensor.

17. The motor vehicle according to claim 10, further comprising a vehicle body defining the cabin, arranged along a longitudinal axis, and defined by longitudinal body sides, a floor, and a roof, and wherein the plurality of radiant heating tiles is arranged along the longitudinal axis in an array proximate one of the longitudinal body sides, the floor, and the roof.

18. The motor vehicle according to claim 10, further comprising a forced-air climate control system, and wherein the electronic controller is additionally configured to supplement a heat output of the forced-air climate control system with the thermal energy generated by the plurality of radiant heating tiles, by coordinating regulation of the forced-air climate control system and the selective control of the plurality of radiant heating tiles.

* * * * *